(12) United States Patent
Murray

(10) Patent No.: US 10,812,289 B2
(45) Date of Patent: Oct. 20, 2020

(54) RESPONSES TO LOOPS IN NETWORKS HAVING A RING TOPOLOGY

(71) Applicant: Hewlett Packard Enterprise Development LP, Houston, TX (US)

(72) Inventor: Christopher Murray, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 116 days.

(21) Appl. No.: 16/080,598

(22) PCT Filed: Mar. 18, 2016

(86) PCT No.: PCT/US2016/023022
§ 371 (c)(1),
(2) Date: Aug. 28, 2018

(87) PCT Pub. No.: WO2017/160306
PCT Pub. Date: Sep. 21, 2017

(65) Prior Publication Data
US 2019/0028299 A1    Jan. 24, 2019

(51) Int. Cl.
*H04L 12/423* (2006.01)
*H04L 12/46* (2006.01)
(Continued)

(52) U.S. Cl.
CPC ........ *H04L 12/423* (2013.01); *H04L 12/2856* (2013.01); *H04L 12/42* (2013.01); *H04L 12/4675* (2013.01); *H04L 63/0236* (2013.01); *H04L 63/104* (2013.01); *H04L 2012/421* (2013.01)

(58) Field of Classification Search
None
See application file for complete search history.

(56) References Cited

U.S. PATENT DOCUMENTS 7,515,530 B2    4/2009    Jain et al.
7,706,258 B2    4/2010    Elie-Dit-Cosaque et al.
(Continued)

FOREIGN PATENT DOCUMENTS

EP    2256995 A2    12/2010

OTHER PUBLICATIONS

"10-port Gigabit L2 Managed Switch," Oct. 2015, pp. 1-6, D-Link (Europe) Ltd.
(Continued)

*Primary Examiner* — Saba Tsegaye
(74) *Attorney, Agent, or Firm* — Hewlett Packard Enterprise Patent Department

(57) ABSTRACT

An example communications device may include communication ports and processing circuitry. The communications device may, when the communication device and peer network nodes are connected in a ring topology to form an access network, detect that a loop exists between the access network and a customer network. In response to detecting the loop, the communication device may automatically block any uplink to the customer network that the communication device may have, and send a message to all of the peer network nodes instructing them to block any uplinks to the customer network they may have.

14 Claims, 6 Drawing Sheets

(51) Int. Cl.
    *H04L 29/06*    (2006.01)
    *H04L 12/28*    (2006.01)
    *H04L 12/42*    (2006.01)

(56)         References Cited

U.S. PATENT DOCUMENTS

| | | |
|---|---|---|
| 7,822,049 B1 | 10/2010 | Moncada-Elias et al. |
| 8,792,337 B2 | 7/2014 | Higgins et al. |
| 2003/0165119 A1 | 9/2003 | Hsu et al. |
| 2007/0237085 A1 | 10/2007 | Tirumalai et al. |
| 2009/0274153 A1* | 11/2009 | Kuo ................ H04L 12/66 370/392 |
| 2011/0267940 A1 | 11/2011 | Koch et al. |
| 2012/0176935 A1 | 7/2012 | Wu |
| 2018/0270083 A1* | 9/2018 | Murray .............. H04L 41/0654 |

OTHER PUBLICATIONS

International Search Report and Written Opinion received for PCT Patent Application No. PCT/US2016/023022, dated Dec. 6, 2016, 11 pages.

\* cited by examiner

RESPONSES TO LOOPS IN NETWORKS HAVING A RING TOPOLOGY

BACKGROUND

Network devices, such as routers, switches, hubs, and the like, communicably connect devices to each other. A network may include multiple network devices connected to one another in a particular arrangement to form a communication infrastructure of the network. The manner in which the various network devices and/or other devices are connected to each other may be referred to as the topology of the network.

One such network topology is a ring topology, in which a group of network devices are connected to each other in a ring, such that each of the network devices in the ring shares a first link with the peer network device adjacent to the network device on one side and shares a second link with the peer network device adjacent to the network device on the other side. Thus, there are two paths from any one network device in the ring to any other network device in the ring (a clockwise path and a counterclockwise path), providing redundancy in the event any link fails. Other devices, such as server blades, personal computers, storage arrays, and the like, may be connected to the network devices that form the ring, and may communicate with each other via the ring of network devices.

DETAILED DESCRIPTION

Figure 1:
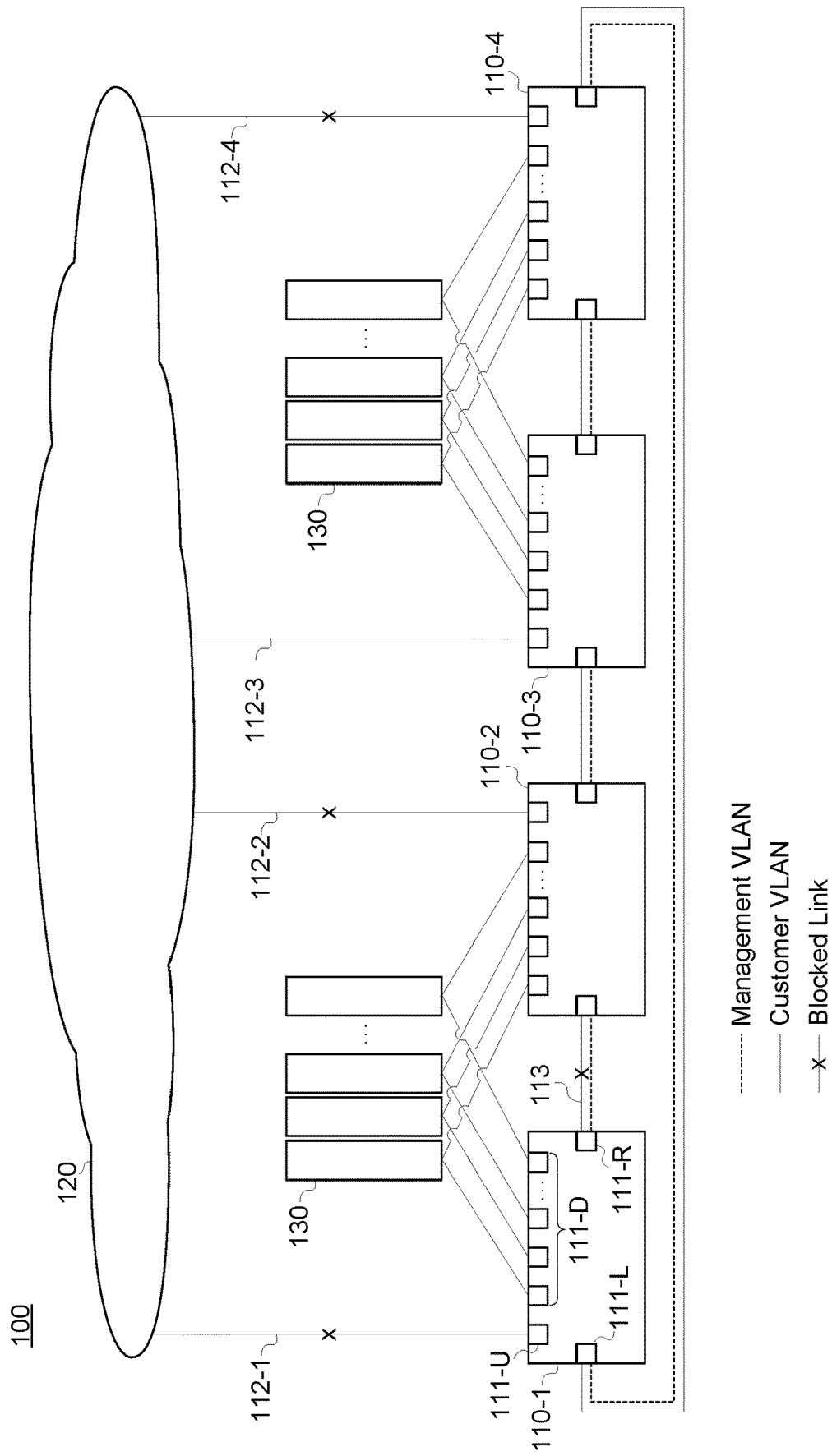
FIG. 1 is a conceptual diagram illustrating an example system.

FIG. 1 illustrates an example system 100. The example system 100 illustrated in FIG. 1 includes example network devices 110, an example customer network 120, and example customer devices 130.

The network devices 110 are connected to each other in a ring topology, and thus they may be referred to collectively as a ring network. The network devices 110 are also connected to the customer network 120 via uplinks 112 and to the customer devices 130. The network devices 110 may allow the customer network 120 to access the customer device 130 or vice-versa, and thus the network devices 110 may also be referred to collectively as an access network.

The network devices 110 include ports 111 that allow the network devices 110 to connect to other devices. In particular, each of the network devices 110 includes two ring ports 111-L and 111-R, which are each connected to a ring port 111-L or 111-R of the adjacent network devices 110. The network devices may also have ports 111-D that may be connected to other devices, such as the customer devices 130. In certain example configurations in which a processing block 150 of the network device 110 (discussed further below) and the ports 111 of the network device 110 are housed in separate chassis, a port 111-D may be used to connect the processing block 150 to the portion of the network device 110 that houses the ports 111. The number of ports 111-D illustrated in FIG. 1 is merely an example, and any number of such ports 111-D (including zero) may be included in any given network device 110. The network devices 110 may also have an uplink port 111-U, which is connected to the customer network 120.

In some example configurations, any one of the ports 111 of a given network device 110 could serve as any one of the ring ports 111-L and 111-R, the uplink port 111-U, and the ports 111-D. Whether a given port 111 is a ring port 111-L or 111-R, an uplink port 111-U, or a port 111-D may be determined by which device the given port 111 is connected to. For example, whichever ports 111 of a given network device 110 are connected to another one of the network devices 110 may be identified as the ring ports 111-L 111-R. As another example, whichever port 111 is connected to the customer network 120 may be identified as the uplink port 111-U. As another example, whichever ports 111 are connected to customer devices 130 may be identified as ports 111-D. In other words, prior to the ports 111 being connected to any other devices, none of the ports 111 are necessarily reserved to be the ring ports 111-L or 111-R, the uplink port 111-U, or the ports 111-D.

In other example configurations, one or more ports 111 may be reserved specifically to operate as one of the ring ports 111-L or 111-R, the uplink port 111-U, or the ports 111-D. For example, each network device 110 may have one port 111 that is specifically configured to function as the uplink port 111-U.

The links between adjacent network devices 110 may be referred to as ring links. A broadcast communication on the ring network will be passed from each network device 110 to its adjacent peers via the ring links, and because all of the network devices 110 are connected in a circle such a broadcast communication will end up being distributed to every network device 110 in the ring network. However, if left unchecked this could result in a loop condition in which the message is repeatedly sent around the ring from network device 110 to network device 110 without end. Thus, the network devices 110 are configured to prevent such loops within the ring network by keeping at least one ring link blocked at any given time, which ensures that any user traffic flowing around the ring will eventually meet a dead-end and stop. An example protocol that implements this may be found in Recommendation G.8032 of the International Telecommunication Union Telecommunication Standardization Sector (ITU-T), which may be referred to as an Ethernet Ring Protection Switching (ERPS) protocol. The ring link that is designated to be blocked may be referred to the ring-protection-link (RPL), and one of the network devices 110 may be designated as the owner of the RPL (referred to as the RPL owner). In the example system 100 shown in FIG. 1, the RPL is link 113 and hence link 113 is blocked. In the example system 110, the RPL owner is the network device 110-1. The RPL owner is responsible for blocking the RPL under normal operating conditions. If another link in the ring fails at some point, the RPL owner unblocks the RPL until the failed link is repaired.

The customer network 120 can be any network or network segment that uses the network devices 110 to access the customer devices 130. It is referred to herein as a "customer" network 120 because it uses the services of the network devices 110 to access the customer devices 130, and thus may be considered as a customer of the network devices 110. However, this usage of the word "customer" should not be interpreted to imply that the customer network 120 necessarily purchases these services, or that an owner and/or operator of the customer network 120 are necessarily a different entity from the owner and/or operator of the network devices 110.

The customer devices 130 may be any devices that can be connected to the network devices 110 and that can communicate with the customer network 120. For example, the customer devices 130 may be servers, workstations, personal computers, storage devices (such as hard disk drives), security cameras, sensors, and so on. In the example shown in FIG. 1, two network devices 110 are connected to each customer device 130 for redundancy, but this is merely one example configuration and other configurations could be used. The customer devices 130 are referred to herein as "customer" devices 130 because the customer network 120 accesses the customer devices 130 via the network devices 110 (or vice versa). However, this usage of the word "customer" should not be interpreted to imply that the customer devices 130 are owned and/or operated by the same entity as the customer network 120, or that the customer devices 130 are exclusive to the customer network 120.

In one example arrangement, the network devices 110 and the customer devices 130 may form a storage-area-network (SAN), which provides data storage for the customer network 120. In this case, the customer devices 130 may be storage arrays. In one application of this example, a service provider may own and/or operate the SAN, and may run the customer devices 130 and provide access thereto (via the network devices 110) as a service to the customer network 120. In another application of this example, the customer network 120 and the SAN are merely different segments of a larger network owned and/or operated by the same entity.

The network devices 110 may be configured to form a customer virtual local-area-network (VLAN), which may include the customer devices 130. A ULAN is a broadcast domain of a computer network that is isolated from other broadcast domains of the network at the data link layer, where a broadcast domain is a logical division in which all nodes thereof can reach each other by broadcast or multicast at the data link layer. A VLAN may be formed, for example, by assigning certain ports 111 of a network device 110 to the VLAN, such that when the network device 110 receives a broadcast message for the VLAN, the network device 110 passes that message on to only those of its ports that are assigned to that VLAN. A VLAN may also be formed, for example, by logically associating specific devices with VLANs and tagging packets with a VLAN identifier, such that the network device 110 passes received packets on to only those devices that are associated with the VLAN that is indicated by the packet's tag. The customer VLAN may allow the customer network 120 to access the customer devices 130, while keeping other domains of the network logically isolated from the customer network 120 and/or the customer devices 130. Although only one customer VLAN is illustrated in FIG. 1, there may be multiple customer VLANs formed on the network devices 110, which may each be connected to a different customer network.

The network devices 110 may also be configured to form a management VLAN. The management VLAN may include the network devices 110 themselves, and may also include other management devices (not illustrated), such as management servers. In certain example configurations in which the processing block 150 of the network device 110 and the ports 111 of the network device 110 are housed in separate chassis, the chassis housing the processing block 150 of the network device 110 may also be included within the management VLAN. The management VLAN may allow messages related to managing the network devices 110 to be communicated between the network devices 110 while keeping these messages logically isolated from other domains of the network, such as the customer ULAN.

As illustrated in FIG. 1, logical links associated with the customer VLAN (shown in solid lines) and logical links associated with the management VLAN (shown in dashed lines) may share the same physical link in some circumstances. For example, the ring links, which connect the ring port 111-L of one network device 110 to the ring port 111-R of another network device 110, may carry both customer VLAN and management VLAN traffic. Management VLAN traffic may be given a higher priority than customer ULAN traffic.

The uplink port 111-U of each network device 110 that is connected to the customer network 120 forms part of an uplink 112 to the customer network 120. In FIG. 1, each of the network devices 110-1 through 110-4 has an uplink 112 to the customer network 120, but this need not necessarily be the case. A minimum of one network device 110 should have an uplink 112 to the network 120. Multiple uplinks to the network 120 may provide redundancy and allow for load balancing. Generally, the network devices 110 attempt to keep at most one of the uplinks 112 unblocked (i.e., able to carry traffic to/from the customer network 120) at any given time, with the other uplinks 112 being blocked. This is done in order to prevent loops occurring between the ring network and the customer network 120. When two uplinks 112 are unblocked at the same time, a loop could occur between the ring network and the customer network 120, which can result in diminishing the performance of the network.

The blocking of an uplink 112 may include, for example, deactivating the associated uplink port 111-U, which cuts the connection to the network 120 entirely. However, the uplink 112 may also be blocked without deactivating the associated uplink port 111-U; for example, the uplink port 111-U may be assigned to a VLAN that is isolated from the customer VLAN. This has the effect of preventing any customer traffic from flowing through the uplink port 111-U (i.e., blocking the uplink 112), but allows the connection to remain active with the customer network 120. The blocked uplinks 112 are indicated in FIG. 1 with an X on their link.

Although the network devices 110 attempt to keep at most one of the uplinks 112 unblocked at any given time in order to prevent loops between the ring network and the customer network 120, the network devices 110 are not always able to ensure that this is the case. In particular, there are scenarios in which multiple uplinks 112 might end up being unblocked at the same time despite the efforts of the network devices 110. For example, two uplinks 112 might be activated simultaneously, which could potentially result in both uplinks 112 remaining unblocked. Thus, the network devices 110 are configured to detect such loops and to resolve the loops appropriately (discussed further below). These loops between the ring network and the customer network 120 are different than the loops within the ring network that were described above, and the loops between the ring network and the customer network 120 are not prevented or corrected by the ring protection protocols such as G.8032.

Hereinafter, references to a loop should be understood to mean a loop between the ring network and the customer network 120, rather than a loop within the ring network, unless specifically indicated otherwise.

Each of the network devices 110 may be configured to detect the existence of a loop between the ring network and the customer network 120. Any methods for detecting such loops may be used. For example, the network device 110 may have a switch driver that is programmed with a field processor rule that identifies any received packets whose source MAC address is the same as a MAC address associated with the network device 110. If such a packet is received, this would indicate a loop exists that includes the network device 110.

The network devices 110 may each be configured to take certain actions in response to detecting a loop. In particular, the network device 110 that detects the loop may automatically block its own uplink 112 to the customer network 120 (if it has an uplink 112). For example, the uplink port 111-U may be disabled or placed into an isolated VLAN. In addition, the network device 110 that detected the loop may automatically broadcast a message to all of the other network devices 110 via the management VLAN notifying them that the loop was detected and instructing them to block their uplinks 112 (if they have one). Upon receiving this notification, each network device 110 may automatically block its own uplink 112. Because the management ULAN may have a higher priority than the customer VLAN, the loop detection message may be ensured to be delivered to the network devices 110 despite the network congestion that may result from a loop.

The instruction to the network devices 110 to block their uplinks 112 may be any message that will automatically cause a recipient network device 110 to block its uplink 112 (if it has one), regardless of whether the message may be described as a notification, a command, an instruction, a request, or anything else. Thus, for example, a notification that a loop was detected may also be an instruction to a network device 110 to block its uplink 112 if the network device 110 is configured to automatically block its uplink in response to being notified that a loop exists.

The network device 110 that is the RPL owner may perform additional operations beyond those described above in response to a loop detection event. In particular, if the RPL owner receives a message that includes the notification that a loop exists, the RPL owner may automatically broadcast another message to all of the network devices 110 via the management VLAN instructing them to block their uplinks 112. This additional message provides a layer of redundancy to ensure that all of the network devices 110 receive a message instructing them to block their uplink 112. This message from the RPL owner may also serve as an acknowledgement to the network device 110 that detected the loop, acknowledging that the RPL owner received the initial loop-detected message.

Thus, after the various loop-detection messages have been sent (which may include messages from both the network device 110 that detected the loop and from the RPL owner), every uplink 112 in the system 110 should be blocked. This will automatically stop any loop between the ring network and the customer network 120.

Because the network device 110 that detects the loop not only blocks its own uplink 112, but also instructs the other network devices 110 to block their uplinks 112, the loop is more assuredly shut down than if the network device 110 had only shut down its own uplink 112, since multiple network devices 110 do not have to independently detect the loop before all of the uplinks 112 are blocked.

In addition to the operations described above, the network device 110 that is the RPL owner may also be responsible for automatically recovering from the loop and the shutdown of traffic that results. In particular, when the RPL owner becomes aware of the existence of a loop (whether by detecting the loop itself, or by being notified by another network device 110), the RPL owner may start a recovery timer and wait for a particular amount of time to elapse. If another loop detection message is not received before the designated amount of time elapses, then the RPL owner may automatically select an uplink 112 to unblock, and send a message via the management VLAN instructing only the network device 112 that has the selected uplink 112 to unblock the uplink 112. Note that, as used herein, selecting an uplink 112 may include indirectly selecting the uplink 112; for example, selecting a network device 110 may be an indirect selection of the uplink 112 that is associated with the selected network device 110.

Thus, the system 100 automatically recovers from the loop condition and resumes normal operations without requiring an administrator to recover the system. Furthermore, because all of the uplinks 112 are blocked when the RPL owner begins recovery operations, and because only one network device 110 is instructed by the RPL owner at this time to unblock its uplink 112, it can be ensured that after the recovery operation only one uplink 112 will be unblocked, which should prevent any loops from recurring (at least until some network configuration is changed that might result in a loop).

The uplink 112 that is selected by the RPL owner for unblocking may be the same uplink 112 that was previously unblocked, or may be a different uplink 112. The RPL owner may know which network devices 110 have uplinks 112 by, for example, having each network device 110 that has an uplink 112 send a message to the RPL owner notifying the RPL owner that it has a uplink 112, and the RPL owner may maintain a table of the network devices 110 with uplinks 112. The RPL owner may select the uplink 112 (or select a network device 110 that has an uplink 112) based on any criteria. For example, the RPL owner may use information about previous network traffic of the ring network and/or the customer network 120 to select an uplink 112 that will result in suitable network performance. For example, if a particular edge device of the customer network 120 is highly congested, selecting the uplink 112 that connects to this edge device may result in less than suitable network throughput, while selecting an uplink 112 that is connecting to an edge device with comparatively little congestion may result in suitable network throughput. As another example, the RPL owner may select the uplink 112 that is to be unblocked randomly or in a round-robin fashion. As another example, the RPL owner may maintain a list of network devices 110 that have uplinks 112 and may select a first network device 110 registered in the list.

Of course, it is possible that the RPL owner is also the network device 110 that initially detects the loop, in which case the RPL owner may perform the same operations that any other network device 110 would perform if they detected the loop, in addition to the operations described above that are specific to the RPL owner.

Figure 2:
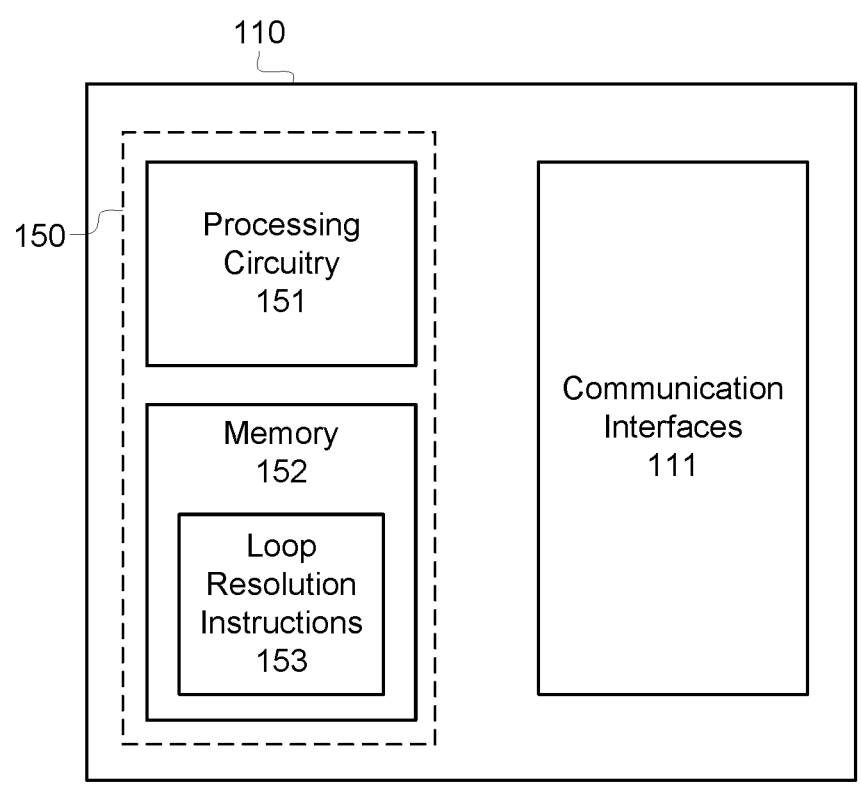
FIG. 2 is a conceptual diagram illustrating an example network device.

FIG. 2 is a conceptual diagram illustrating an example configuration of one of the network devices 110. The example network device 110 may include a processing block 150 in addition to the ports 111 that were already mentioned above. The processing block 150 may include, for example, processing circuitry 151 and a memory 152. The processing circuitry 151 may be any circuitry capable of executing machine-readable instructions, such as a central processing unit (CPU), a microprocessor, a microcontroller device, a digital signal processor (DSP), etc. The memory 152 may be any non-transitory machine readable medium, which may include volatile storage media (e.g., DRAM, SRAM, etc.)

and/or non-volatile storage media (e.g., PROM, EPROM, EEPROM, NVRAM, hard drives, optical disks, etc.). The memory 152 may store machine-readable instructions that, when executed by the processing circuitry 151, cause the network device 110 to perform operations described herein. For example, the memory 153 may include loop resolution instructions 153, which may include instructions to perform any of the operations described herein, such as the operations described in FIGS. 3-6. The memory 152 may be one example of the non-transitory computer readable medium 1000 illustrated in FIG. 6, in which case the interface controller instructions 153 would correspond to the interface controller instructions 1010 (described below). The processing block 150 may also include, in addition to or in lieu of the processing circuitry 151 and memory 152, an application-specific integrated circuit (ASIC), a field-programmable gate array (FPGA), an application-specific instruction set processor (ASIP), or the like, configured to perform certain operations described herein. Although only one processing circuitry 151 and one memory 152 are illustrated, multiple instances of these may be included as components of the network device 110.

In certain examples, the processing block 150 is not necessarily included within the same chassis or physical device as the ports 111. For example, the network device 110 could be a collection of physically distinct devices or modules that are communicably connected, such as one device that includes the ports 111 and another device that includes some or all of the processing block 150. For example, a network switch may include the ports 111 and a separate switch controller may include some or all of the processing block 150. In such an example, the switch controller may be connected to its corresponding network switch via a communications interface, such as via one of the ports 111 or via some other dedicated interface. In such an example, certain portions of the processing block 150 might be included in the switch, such as a switch driver and/or various DSPs, ASICs, FPGAs, or ASIPs, while certain other portions of the processing block 150, such as processing circuitry 151 and a memory 152, may be included in the switch controller. In such an example, the various portions of the processing block 150, which may be distributed across the switch device and the separate controller device, may work together to control various operations of the network device 110.

In other examples, all of the processing block 150 may be included within the same chassis as the ports 111. For example, the network device 110 may be a network switch that has its own internal processing circuitry 151 that is sufficient to allow the switch to perform the operations described herein without requiring a distinct switch controller. For example, the network device 110 may be a network switch that includes its own processing circuitry 151 and memory 152, where the memory 152 includes instructions to perform operations described herein.

Figure 3:
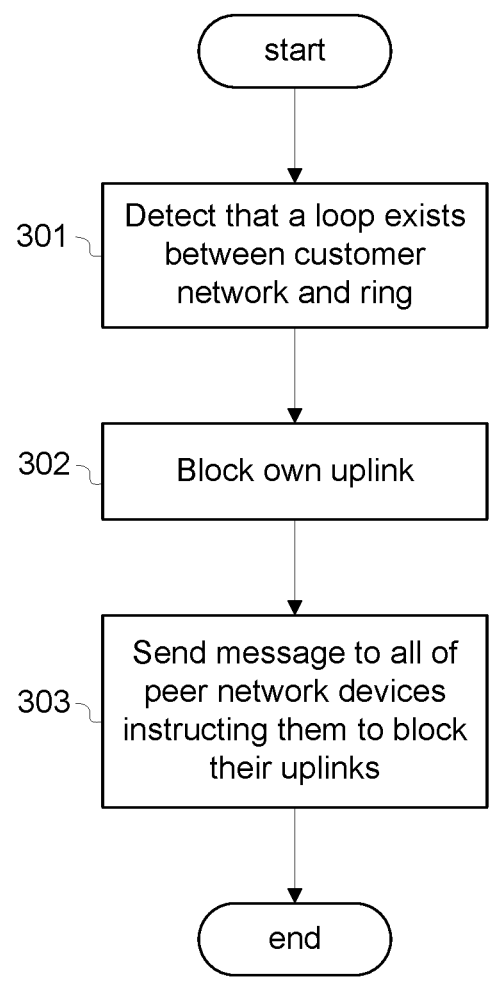
FIG. 3 is a process flow diagram illustrating an example process.

FIG. 3 illustrates an example process for resolving a loop. The example process may be performed, for example, by the processing block 150 of the example network device 110. For example, processing circuitry 151 may execute machine-readable instructions that cause the network device 110 to perform the operations of the example process.

In block 301, a network device 110 detects that a loop exists between the customer network 120 and the ring network.

In block 302, in response to the detection of block 301, the network device 110 that detected the loop automatically blocks its own uplink 112 to the customer network 120.

In block 303, the network device 110 that detected the loop automatically sends a message to the other network devices 110 of the ring that instructs them to block their own uplinks.

Figure 4:
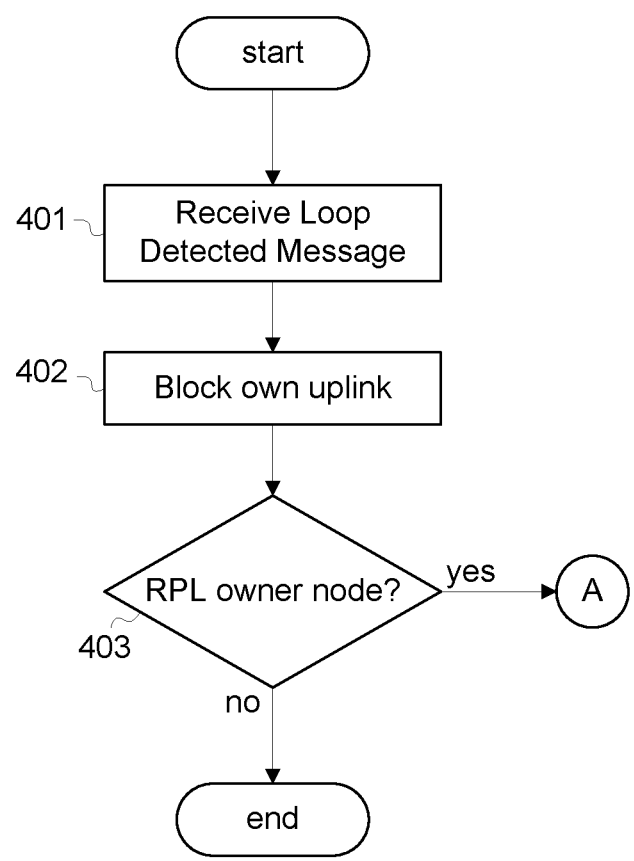
FIG. 4 is a process flow diagram illustrating an example process.

FIG. 4 illustrates another example process for resolving a loop. The example process may be performed, for example, by the processing block 150 of the example network device 110. For example, processing circuitry 151 may execute machine-readable instructions that cause the network device 110 to perform the operations of the example process.

In block 401, a network device 110 receives a notification from another network device 110 that a loop between the ring network and the customer network 120 was detected.

In block 402, in response to the notification of block 401, the network device 110 that received the notification automatically blocks its own uplink 112 to the customer network 120.

In block 403, it is determined whether the network device 110 that received the notification is the RPL owner node. If so (block 403=YES), then the process proceeds to block A, which continues in FIG. 5. If not (block 403=NO), the process ends.

Figure 5:
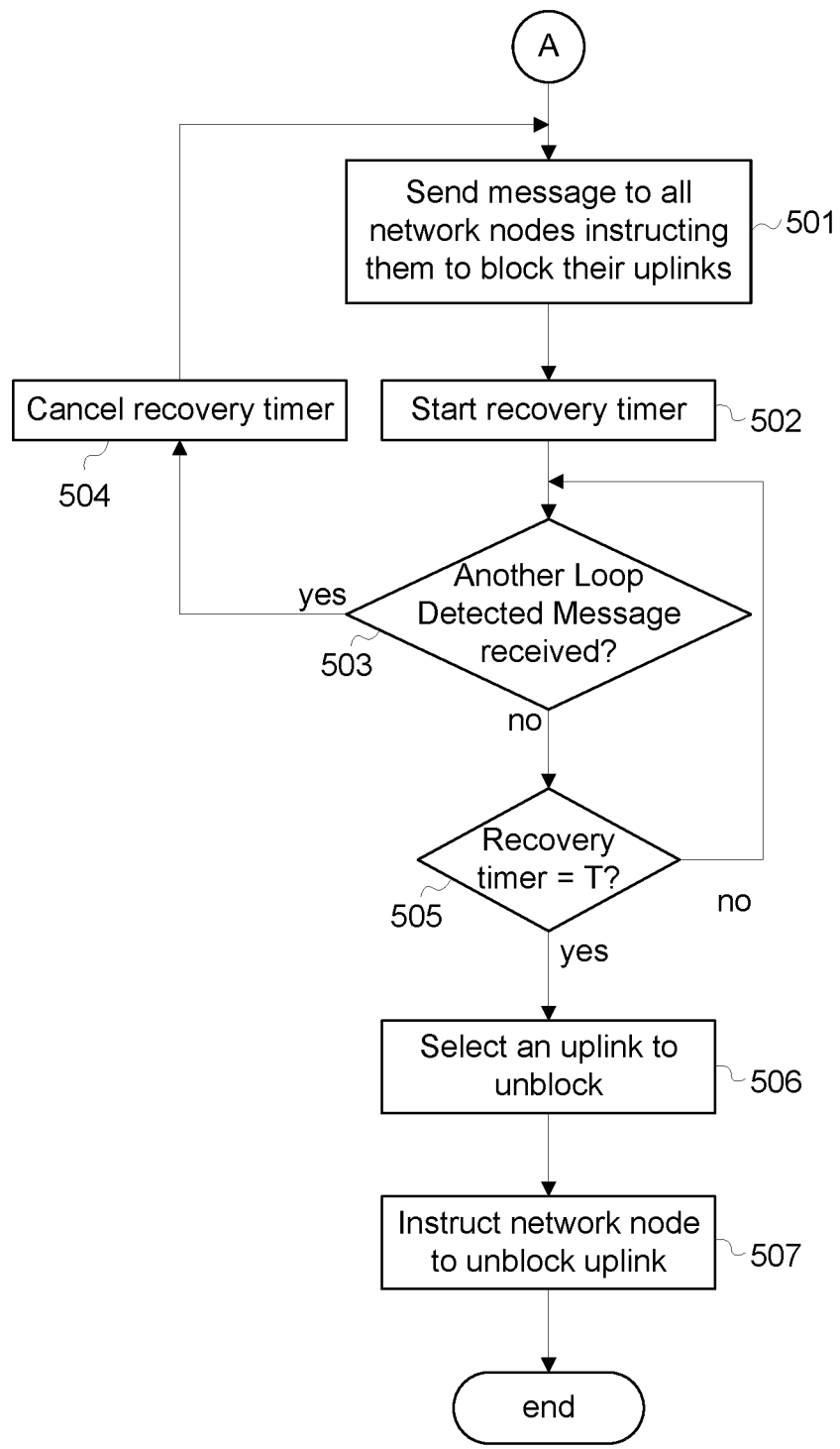
FIG. 5 is a process flow diagram illustrating another example process.

FIG. 5 illustrates a continuation of the example process of FIG. 4 starting with block A. Block A is reached when the network device 110 that received the notification is the RPL owner node (block 403=YES).

In block 501, the RPL owner sends a message to all of the network devices 110 in the ring network instructing them to block their uplinks 112 to the customer network 120.

In block 502, the RPL owner starts a recovery timer.

In block 503, it is determined whether another loop-detected message is received from one of the network devices 110. If so (block 503=YES), then the process proceeds to block 504 and the recovery timer is canceled, another message is sent (block 501), and the recovery timer is restarted (block 502). If not (block 503=NO), then the process proceeds to block 505.

In block 505, it is determined whether the recovery timer has reached a specific value T (i.e., whether a recovery waiting period has ended). If not (block 505=NO), then the process returns to block 503, and continues to loop between blocks 503 and 505 until either another loop-detected message is received (block 503=YES) or the recovery waiting period ends (block 505=YES). When block 505 is eventually answered YES, then the process proceeds to block 506.

In block 506, the RPL owner selects one of the uplinks 112 to unblock.

In block 507, the RPL owner instructs the network device 110 that has the selected uplink 112 to unblock the selected uplink 112.

Figure 6:
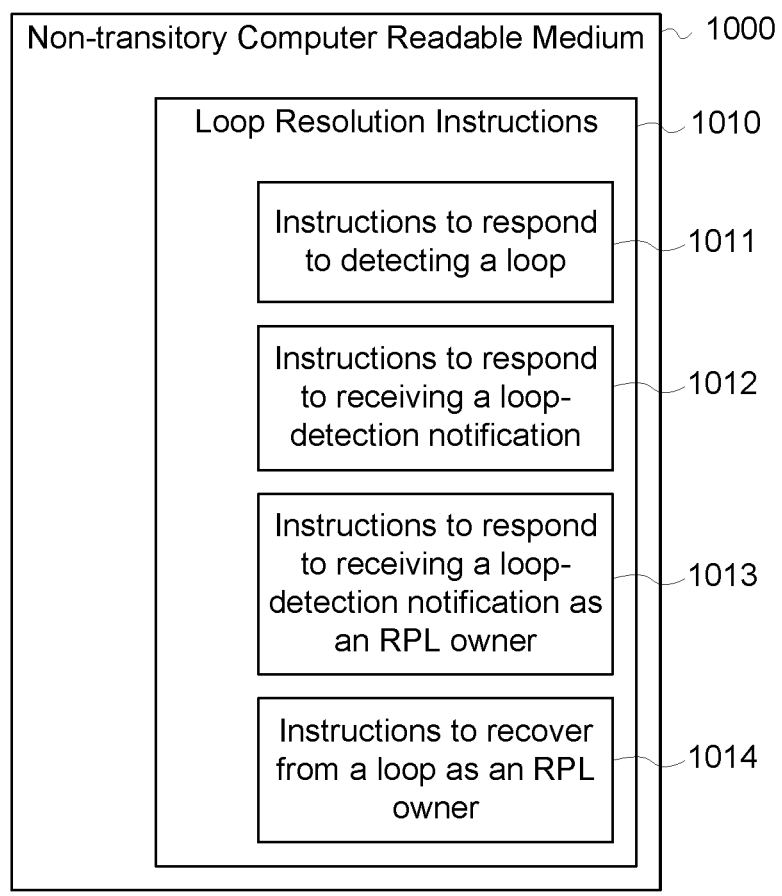
FIG. 6 is a conceptual diagram illustrating an example non-transitory computer readable medium.

FIG. 6 illustrates an example non-transitory computer readable medium 1000, The non-transitory computer readable medium 1000 may include volatile storage media (e.g., DRAM, SRAM, etc.) and/or non-volatile storage media (e.g., PROM, EPROM, EEPROM, NVRAM, hard drives, optical disks, etc.). The non-transitory computer readable medium 1000 may store machine-readable instructions that are configured to, when executed by processing circuitry (such as the processing circuitry 151) of a network device (such as the network device 110), cause the network device to perform operations described above, such as the operations described in FIGS. 3-5, The memory 152 may be one example of the non-transitory computer readable medium 1000.

For example, the non-transitory computer readable medium 1000 may include loop resolution instructions 1010. The loop resolution instructions 1010 may be to implement certain operations described above, such as the operations described in FIGS. 3-5. The loop resolution instructions 1010 may include, for example, instructions to respond to detecting a loop 1011, instructions to respond to receiving a loop-detection notification 1012, instructions to respond to receiving a loop-detection notification as an RPL owner 1013, and instructions to recover from a loop as an RPL owner 1014. The loop resolution instructions 1010 may include additional instructions (not illustrated) to implement any or all of the operations described herein.

The instructions to respond to detecting a loop 1011 may include, for example, instructions to detect that a loop exists between an access network in a ring topology and a customer network 112, and in response to detecting the loop, automatically: block any uplink 112 to the customer network 120 that the network device 110 may have, and send a message to all of the peer network nodes instructing them to block any uplinks 112 to the customer network 120 they may have.

The instructions to respond to receiving a loop-detection notification 1012 may include, for example, instructions to, in response to receiving a message from a peer network nodes instructing the network device 110 to block its uplink 112, block any uplink 112 to the customer network 120 that the network device 110 may have.

The instructions to respond to receiving a loop-detection notification as an RPL owner 1013 may include, for example, instructions to, in response to receiving a notification that a loop exists between a ring network and a customer network 120, automatically send a message to all network nodes of the ring network instructing them to block any uplinks 112 they may have to the customer network 120.

The instructions to recover from a loop as an RPL owner 1014 may include, for example, instructions to, if a particular period of time elapses after sending the message without receiving another notification that a loop exists between the ring network and the customer network 120, automatically select one of the network nodes that has an uplink 112 connection to the customer network 120 and instruct the selected network node to unblock its uplink to the customer network 120.

The foregoing describes techniques for automatically responding to loops between a ring network and a customer network, and techniques for automatically recovering from the same. While the above disclosure has been shown and described with reference to the foregoing examples, it should be understood that other forms, details, and implementations may be made without departing from the spirit and scope of this disclosure.

What is claimed is:

1. A communication device, comprising:
  a plurality of communication ports; and
  processing circuitry to, when the communication device and peer network nodes are connected in a ring topology to form an access network:
    detect that a loop exists between the access network and a customer network, and
    in response to detecting the loop:
      block any uplink to the customer network that the communication device may have, and
      broadcast a message to all of the peer network nodes in the ring topology to instruct all of the network nodes to block any uplinks to the customer network they may have.

2. The communication device of claim 1,
wherein the processing circuitry is further to, when the communication device and the peer network nodes are connected in the ring topology to form the access network, in response to receiving a message from one of the peer network nodes instructing the communication device to block its uplink, block any uplink to the customer network that the communication device may have.

3. The communication device of claim 1,
wherein the communication device is a ring protection link owner of the ring topology, and wherein the processing circuitry is further to, when the communication device and the peer network nodes are connected in the ring topology to form the access network:
  in response to receiving a message from one of the peer network nodes indicating that a loop exists between the access network and the customer network:
    block any uplink to the customer network that the communication device may have,
    broadcast a second message to all of the peer network nodes connected in the ring topology to instruct them to block any uplinks they may have to the customer network, and
    if a particular amount of time elapses without receiving another message from one of the peer network nodes indicating that a loop exists between the access network and the customer network, select a device that has an uplink to the customer network from the peer network nodes and the communication device and instruct the selected device to unblock its uplink to the customer network.

4. The communication device of claim 1,
wherein the access network is an Ethernet ring network implementing an Ethernet-ring-protection-switching protocol.

5. The communication device of claim 1,
wherein the access network includes a management virtual-local-area-network (VLAN) that is logically isolated from the customer network, and
the broadcast message is sent to all of the peer network nodes in the ring topology via the management VLAN that is logically isolated from the customer network.

6. A system comprising:
an access network comprising network devices connected in a ring topology,
wherein each of the network devices is to:
  in response to detecting a loop between the access network and a customer network:
    block any uplink connection to the customer network that the respective network device may have, and
    broadcast a notification to all of the network devices in the ring topology indicating that the loop was detected; and
  in response to receiving a notification that a loop between the access network and the customer network was detected, block any uplink connection to the customer network that the respective network device may have.

7. The system of claim 6,
wherein one of the network devices is a ring-protection-link owner, and
the ring-protection-link owner is configured to, in response to receiving the notification that the loop between the access network and the customer network was detected:
  broadcast a message to all other network devices in the ring topology to instruct all other network devices to block any uplink connection to the customer network that they may have, and if a particular amount of time elapses without receiving another notification that a loop exists between the access network and the customer network, select one of the network devices that has an uplink connection to the customer network and instruct the selected network device to unblock its uplink to the customer network.

8. The system of claim 6,
wherein the access network is an Ethernet ring network implementing an Ethernet-ring-protection-switching protocol.

9. The system of claim 6,
wherein the access network includes a management virtual-local-area-network (VLAN) that is logically isolated from the customer network, and
the notification that the loop was detected is broadcast to all of the network devices via the management VLAN that is logically isolated from the customer network.

10. A non-transitory machine-readable medium comprising instructions that, when executed by processing circuitry of a ring-protection-link owner node of a ring network, cause the ring-protection-link owner node to:
in response to receiving, from a network node in the ring network, a notification that a loop exists between the ring network and a customer network, broadcast a message to all network nodes of the ring network to instruct all peer nodes to block any uplinks they may have to the customer network.

11. The non-transitory machine-readable medium of claim 10,
wherein the instructions are further to cause the ring-protection-link owner node to, in response to receiving, from a network node in the ring network, the notification that the loop exists between the ring network and the customer network, block any uplink to the customer network that the ring-protection-link owner node may have.

12. The non-transitory machine-readable medium of claim 10,
wherein the instructions are further to cause the ring-protection-link owner node to, in response to receiving the notification that the loop exists between the ring network and the customer network,
if a particular period of time elapses after broadcasting the message without receiving another notification that a loop exists between the ring network and the customer network, select one of the network nodes that has an uplink connection to the customer network and instruct the selected network node to unblock its uplink to the customer network.

13. The non-transitory machine-readable medium of claim 10,
wherein the ring network is an Ethernet ring network implementing an Ethernet-ring-protection-switching protocol.

14. The non-transitory machine-readable medium of claim 10,
wherein the ring network includes a management virtual-local-area-network (VLAN) that is logically isolated from the customer network, and
wherein the broadcast message is sent to all network nodes of the ring network via the management VLAN that is logically isolated from the customer network.

* * * * *